(12) United States Patent
Delaite et al.

(10) Patent No.: US 6,642,317 B1
(45) Date of Patent: Nov. 4, 2003

(54) COMPOSITION BASED ON PROPYLENE POLYMERS AND PROCESS FOR OBTAINING SAME

(75) Inventors: Emmanuel Delaite, Braine-le-Comte (BE); Hervé Cuypers, Ceroux-Mousty (BE)

(73) Assignee: Polypropylene Belgium Naamlose Vennootschap, Brussels (BE)

( * ) Notice: Subject to any disclaimer, the term of this patent is extended or adjusted under 35 U.S.C. 154(b) by 0 days.

(21) Appl. No.: 09/712,166

(22) Filed: Nov. 15, 2000

(51) Int. Cl.$^7$ ................................................ C08L 23/00
(52) U.S. Cl. ...................................................... 525/240
(58) Field of Search .......................................... 525/240

(56) References Cited

U.S. PATENT DOCUMENTS

| | | |
|---|---|---|
| 4,210,729 A | 7/1980 | Hermans et al. |
| 4,626,555 A | 12/1986 | Endo et al. |
| 5,204,305 A | 4/1993 | Fiasse et al. |
| 6,110,986 A | 8/2000 | Nozawa et al. |

FOREIGN PATENT DOCUMENTS

| | | |
|---|---|---|
| DE | 44 20 590 A1 | 12/1995 |
| EP | 0 261 727 A1 | 9/1986 |
| EP | 0 317 995 A2 | 11/1987 |
| EP | 0 334 411 A1 | 3/1988 |
| EP | 0 470 701 | 2/1992 |
| EP | 0 483 682 | 5/1992 |
| EP | 0 860 457 A1 | 8/1998 |
| EP | 0 893 470 A1 | 1/1999 |

OTHER PUBLICATIONS

R.J. Crawford, "Plastics Engineering" $2^{nd}$ Edition, 1987, pp. 3–4.
SPE 00/19.

*Primary Examiner*—Edward J. Cain
(74) *Attorney, Agent, or Firm*—Wallace L. Oliver; Nirav Patel

(57) ABSTRACT

The present invention provides a composition, which includes:
(a) from 10 to 55 parts by weight of a propylene polymer (A) which includes up to 2% by weight of ethylene and having a melt flow index $MFI_{(A)}$ of 0.1 to 30 g/10 minutes, measured according to ASTM D 1238 (1986) under a load of 2.16 kg at 230° C.; and
(b) from 90 to 45 parts by weight of a polymer (B), which is a statistical copolymer of propylene which includes from 1 to 10% by weight of ethylene and having a melt flow index $MFI_{(B)}$ of 0.1 to 30 g/10 minutes;
wherein the ethylene concentration of polymer (B) is greater than that of polymer (A). Another embodiment of the invention provides an article, which includes the above-described composition. Another embodiment of the invention provides a process for preparing the above-described composition, which includes two successive polymerization stages, wherein 10 to 55 parts by weight of polymer (A) and from 90 to 45 parts by weight of polymer (B) are respectively prepared.

20 Claims, No Drawings

COMPOSITION BASED ON PROPYLENE POLYMERS AND PROCESS FOR OBTAINING SAME

BACKGROUND OF THE INVENTION

1. Field of the Invention

The present invention relates to a composition based on propylene polymers exhibiting an improved compromise between rigidity and weldability. It relates more particularly to a composition suitable for use in making numerous articles such as films, sheets or expanded granules as well as to a process for preparation of such a composition.

2. Discussion of the Background

It is known that propylene polymers can be used for numerous applications such as the manufacture of preformed articles, films, sheets and cellular articles. In these applications, polypropylene is preferred to other plastic materials by virtue of its chemical resistance, its heat resistance and/or its impact resistance and rigidity.

For example, European Patent Application 0860457 describes the use of a propylene block copolymer containing 60 to 90 wt % of a propylene homopolymer and 40 to 10 wt % of a statistical propylene copolymer containing 1 to 10 wt % of ethylene for the manufacture of molded articles such as, in particular, bioriented bottles. The preferred compositions, which contain more than 75 wt % of homopolymer, do not have sufficient weldability, however, for applications such as films or cellular articles.

In addition, European Patent Application 0893470 discloses the use, for the manufacture of expanded granules, of compositions containing 60 to 90 parts by weight of a propylene homopolymer having a melt flow index (MFI) ranging from 0.1 to 20 g/10 minutes and 40 to 10 parts by weight of a statistical propylene copolymer which contains 3 to 20 mol % of a comonomer such as ethylene and which has an MFI of 25 to 3000 g/10 minutes. However, the use of the preferred compositions, in which the ratio of the MFI of the copolymer to that of the homopolymer is greater than 20, leads to heterogeneities. In addition, the use of such resins is economically disadvantageous because of their high manufacturing cost.

Finally, German Patent Application 4420590 discloses polyolefin foam particles of uniform density obtained from a mixture compatible with at least two different propylene polymers, wherein the majority of the mixture is formed from propylene copolymers and terpolymers, at least one of which contains 1-butene. Again, the high cost of the compositions due to the butene copolymer or copolymers (low polymerization yield, cost of monomer recycling installations) prevents their widespread use.

SUMMARY OF THE INVENTION

Accordingly, one object of the present invention is to provide a composition which does not suffer from the disadvantages of the conventional compositions.

Another object of the present invention is to provide a composition having improved processability.

Another object of the present invention is to provide a composition having a good balance of mechanical properties and sealing properties.

These and other objects have now been achieved by the present invention, the first embodiment of which provides a composition, which includes:

(a) from 10 to 55 parts by weight of a propylene polymer (A) which includes up to 2% by weight of ethylene and having a melt flow index $MFI_{(A)}$ of 0.1 to 30 g/10 minutes, measured according to ASTM D 1238 (1986) under a load of 2.16 kg at 230° C.; and (b) from 90 to 45 parts by weight of a polymer (B), which is a statistical copolymer of propylene which includes from 1 to 10% by weight of ethylene and having a melt flow index $MFI_{(B)}$ of 0.1 to 30 g/10 minutes;

wherein the ethylene concentration of polymer (B) is greater than that of polymer (A).

Another embodiment of the invention provides an article, which includes the above-described composition.

Another embodiment of the invention provides a process for preparing the above-described composition, which includes two successive polymerization stages, wherein 10 to 55 parts by weight of polymer (A) and from 90 to 45 parts by weight of polymer (B) are respectively prepared.

DESCRIPTION OF THE PREFERRED EMBODIMENTS

Various other objects, features and attendant advantages of the present invention will be more fully appreciated as the same becomes better understood from the following detailed description of the preferred embodiments of the invention.

Preferably, the composition according to the present invention includes:

from 10 to 55 parts by weight of a propylene polymer (A) which can contain up to 2% by weight of ethylene and has a melt flow index (MFI) of 0.1 to 30 g/10 minutes, measured according to ASTM D 1238 (1986) under a load of 2.16 kg at 230° C., and from 90 to 45 parts by weight of a polymer (B), which is a statistical copolymer of propylene containing from 1 to 10 wt % of ethylene and having an MFI of 0.1 to 30 g/10 minutes, the ethylene concentration of polymer (B) being greater than that of polymer (A).

Preferably, polymers (A) and (B) are semicrystalline within the meaning conveyed in "Plastics Engineering", 2nd Edition, R. J. Crawford, Pergamon Press (1987), pages 3 and 4, the entire contents of which are hereby incorporated by reference. Preferably, they contain less than 1 wt % of monomeric units derived from 1-butene. Compositions whose polymers (A) and (B) do not contain any monomeric units derived from 1-butene are particularly preferred.

Polymer (A) preferably has a modulus of elasticity in flexion (measured at 23° C. on an injection-molded specimen with a thickness of 4 mm in accordance with ASTM D 790 M-flexural modulus) of 1000 to 2000 MPa. More preferably, the above-noted modulus is 1200 to 1800 MPa, more particularly preferably 1400 to 1600 MPa, and most preferably 1500 MPa. These ranges include all values and subranges therebetween, including 1100, 1300, 1700 and 1900 MPa. Preferably polymer (B) has a flexural modulus of 400 to 1600 MPa, more preferably 600 to 1400 MPa, more particularly preferably 800 to 1200 MPa, most preferably 1000 to 1100 MPa. These ranges include all values and subranges therebetween, including 500, 700, 900, 1300 and 1500.

Preferably, propylene polymer (A) contains at least 0.1 wt % and more preferably at least 0.2 wt % of ethylene. More particularly preferably, propylene polymer (A) contains at least 0.5 wt % of ethylene, most preferably at least 0.75 wt %, and most particularly preferably at least 1 wt %. Polymers (A) containing at most 1.5 wt % of ethylene yield particularly good results. These ranges include all values and subranges therebetween, including 0.3, 0.4, 0.6, 0.8, 0.7, 0.9, 1.1, 1.2, 1.3 and 1.4 wt %.

Preferably, polymer (B) contains at least 1.5 wt % of ethylene. More preferably, polymer (B) contains at least 1.75 wt % ethylene, more particularly preferably at least 2 wt %, most preferably at least 3 wt %, and most particularly preferably at least 4 wt %. Polymer (B) containing less than 4.8 wt % of ethylene yield particularly good results. Polymer (B) containing at most 5.5 wt % of ethylene are particularly preferred. These ranges include all values and subranges therebetween, including 1.6, 1.8, 2.1, 2.5, 3.5, 4.2, 4.9, 5.0, 5.1, 5.3 and 5.4 wt %.

The comonomer contents mentioned herein are determined by Fourier transform IR spectrometry on the polymer worked into a pressed 200 μm film (thickness). The ethylene contents are estimated from the absorption bands at 732 and 720 cm$^{-1}$.

Preferably, the MFI of polymer (B) ($MFI_{(B)}$) is at least 3 g/10 minutes, more preferably at least 5 g/10 minutes, more particularly preferably at least 10 g/10 minutes, most preferably at least 15 g/10 minutes, and most particularly preferably at least 20 g/10 minutes. These ranges include all values and subranges therebetween, including 4, 6, 8, 9, 11, 14, 16, 18, 22, 25, 28 and 29.

Preferably, the MFI of polymer (A) ($MFI_{(A)}$) is at least 0.4 g/10 minutes. More preferably, the $MFI_{(A)}$ is at least 1 g/10 minutes, more particularly preferably at least 5 g/10 minutes, most preferably at least 10 g/10 minutes, most particularly preferably at least 15 g/10 minutes, and most especially particularly preferably at least 20 g/10 minutes. These ranges include all values and subranges therebetween, including 0.5, 0.8, 1.2, 3, 6, 8, 12, 14, 18, 22, 24, 28, 29 and 30. Values of at most 15 g/10 minutes also yield good results.

Preferably, the $(MFI_{(B)})/(MFI_{(A)})$ ratio is such that $0.8 \leq MFI_{(B)}/MFI_{(A)} \leq 15$. More preferably, the ratio ranges from 1 to 12, more particularly preferably from 2 to 10, most preferably from 4 to 8, and most particularly preferably from 5 to 6. These ranges include all values and subranges therebetween, including 0.9, 3, 7, 11, 13 and 14.

Apart from polymers (A) and (B), the inventive composition may additionally and optionally contain one or more known conventional adjuvants such as stabilizers, pigments, coloring agents, fillers, nucleating agents, fire-retarding agents, antistatic agents, lubricants, non-stick agents, etc. Most preferably, however, the inventive composition contains only polymers (A) and (B) as polymers.

The MFI value of the composition preferably ranges from 1 to 30 g/10 minutes. This value is more preferably at least 3 g/10 minutes. It is also preferably at most 20 g/10 minutes, and more particularly at most 12 g/10 minutes. These ranges include all values and subranges therebetween, including 2, 4, 5, 6, 8, 10, 11, 13, 14, 16, 18 and 19. Different MFI values may make the composition difficult to use.

The inventive composition preferably has a flexural modulus of 600 to 1800 Mpa, more preferably this flexural modulus is 800 to 1600 MPa, more particularly preferably 1000 to 1400 MPa, most preferably 1100 to 1300 MPa. Most often, however this flexural modulus is at least 800 MPa and does not exceed 1600 MPa. These ranges include all values and subranges therebetween, including 700, 900 and 1500.

Compositions according to the invention which are particularly preferred have a flexural modulus of 800 to 1600 MPa and an MFI of 3 to 15 g/10 minutes.

The composition contains from 10 to 55 parts by weight of a propylene polymer (A). More preferably, the composition contains from 20 to 45 parts by weight of (A), more particularly preferably from 25 to 40 parts by weight of (A), and most prefereably from 30 to 35 parts by weight of (A). These ranges include all values and subranges therebetween, including 15, 18, 22, 28, 33, 38, 42, 48 and 52.

The composition contains from 90 to 45 parts by weight of polymer (B). More preferably, the composition contains from 80 to 50 parts by weight of polymer (B), more particularly preferably from 70 to 55 parts by weight, and most preferably from 65 to 60 parts by weight of (B). These ranges include all values and subranges therebetween, including 85, 75, 72, 63, 58, 52, 49 and 46.

The composition according to the invention exhibits good mechanical properties at high temperature. It also exhibits good processability, good mechanical properties and good weldability. It can be processed by all the standard methods for working of thermoplastic materials, such as, for example molding, extrusion and injection, and in all machines and devices used for such purposes. The inventive composition is highly suitable for the manufacture of films and sheets, and more particularly for the manufacture of expanded granules used in production of cellular articles. Transformation of the inventive composition to preformed articles is familiar to those skilled in the art. Transformation of the inventive composition to expanded granules and subsequent molding to cellular articles is preferably achieved in the conventional manner described, for example, in European Patent Application 0317995, U.S. Pat. No. 4,626,555 and European Patent Application 893470, the entire contents of each of which being hereby incorporated by reference.

Polymers (A) and (B) can be prepared in the presence of any catalytic system known to be sufficiently productive and stereospecific, permitting the propylene to be polymerized in isotactic form and capable of incorporating the required quantities of ethylene in the polymer. Such catalytic systems as well as the general conditions for synthesis of these polymers are well known to those skilled in the art.

Polymers (A) and (B) are preferably obtained by polymerization of propylene and, as the case may be, of ethylene by means of catalytic systems that contain a solid based on titanium trichloride, an alkylaluminum and, if necessary, an electron donor. Particularly preferable catalytic systems of this type are described in European Patent Applications 0261727 and 0334411 and in U.S. Pat. No. 4,210,729 and U.S. Pat. No. 5,204,305 (Solvay Polyolefins Europe, Belgium), the entire contents of each of which being hereby incorporated by reference. These catalytic systems permit particularly statistical incorporation of ethylene and lead to the production of polymers having the form of powder with excellent morphology (narrow particle size distribution and regular particles of spheroidal form).

The statistical polymers which are preferentially usable as polymer (B) and, as the case may be, as polymer (A) satisfy the equation:

$$\{C_{2\times 5+}\} \leq 0.0094\{C_{2\times 3}\}^2 - 0.0054\{C_{2\times 3}\} + 0.0375$$

in which $\{C_{2\times 5+}\}$ and $\{C_{2\times 3}\}$, expressed in g/kg and evaluated by Fourier transform infrared absorption spectrometry on the polymer worked into a pressed 200 μm film, represent respectively:

$\{C_{2\times 5+}\}$: the ethylene content corresponding to insertion of two or more than two consecutive ethylene units, measured at 720 cm$^{-1}$, and $\{C_{2\times 3}\}$: the ethylene content corresponding to the insertion of one ethylene unit between two propylene units, measured at the maximum of the absorption band around 732 cm$^{-1}$.

The MFI values of polymers (A) and (B) can be regulated by addition of one or more known molecular weight regulators. The most commonly used of these is hydrogen.

The required quantities of monomer(s) and molecular weight regulator(s) can be introduced continuously or batchwise into the polymerization medium.

Another preferred embodiment of the invention is manufacture of the inventive composition, which is accomplished by mixing polymer (A) and polymer (B) with one another. This mixing process can be achieved by any known process whatsoever, including without limitation blending, extruding and/or melt-processing.

Polymers (A) and (B) can be mixed by synthesizing polymer (A) or (B) and then, in the same medium or in a different medium into which polymer (A) or (B) is introduced, synthesizing polymer (B) or (A). Polymers (A) and (B) can also be mixed mechanically with one another. According to this method, polymers (A) and (B) are prepared separately and mixed in molten form.

In the case of successive syntheses, the process for obtaining the composition preferably includes two successive polymerization stages, in which there are respectively prepared from 10 to 55 parts by weight of propylene polymer (A) and from 90 to 45 parts by weight of polymer (B). Each of the polymerization stages can be performed, according to general conditions well known to those skilled in the art, in the same polymerization medium or in different polymerization media. In general, the polymer present in preponderant quantity will be prepared first, followed by preparation of the minority polymer in the presence of the polymer obtained from the first stage. Each of these stages can be carried out, independently of one another, in suspension in an inert hydrocarbon diluent, in propylene maintained in liquid condition or else in the gas phase (in a stirred or preferably a fluidized bed).

The preferred procedure is polymerization in propylene maintained in liquid condition.

Within the scope of the present invention, it is also preferable to use polymers and/or compositions whose MFI is lower than the desired value, wherein the MFI is adjusted to the desired value by depolymerization ("visbreaking") in conventional manner, preferably by mixing with an organic peroxide at high shear ratio. The conditions of such depolymerization are well known to those skilled in the art. In this way there are obtained polymers and/or compositions whose molecular weight distribution is narrow, resulting in certain cases in effects on the use of the inventive compositions.

EXAMPLES

Having generally described this invention, a further understanding can be obtained by reference to certain specific examples which are provided herein for purposes of illustration only and are not intended to be limiting unless otherwise specified.

The methods of measuring the variables mentioned in the examples, the units expressing these variables and the meanings of the symbols used in these examples are explained hereinafter.

MFI: melt flow index of the composition $MFI_{(B)}$: melt flow index of polymer (B) measured on a sample of this polymer $MFI_{(A)}$: melt flow index of polymer (A) calculated from the relation:

$$\log MFI = \frac{\{A\}}{100} \log MFI_{(A)} + \frac{\{B\}}{100} \log MFI_{(B)}$$

{B}: quantity of polymer (B) present in the composition relative to the total weight of polymer (A) plus polymer (B), expressed in % and estimated by measuring the titanium content of the sample taken at the end of the first stage and the titanium content of the composition {A}: quantity of polymer (A) present in the composition relative to the total weight of polymer (A) plus polymer (B), expressed in % and estimated from the relation {A}=100−{B}

C2 total: total ethylene content expressed in wt % relative to the weight of polymer (A) plus polymer (B), measured on a sample of sequenced polymer worked into a pressed 200 μm film C2(B): ethylene content of copolymer (B) determined on a sample of this polymer by infrared spectrometry as described hereinabove and expressed in wt % relative to the total weight of polymer (B)

C2(A): ethylene content of copolymer (A), determined from the relation:

$$C2(A) = \frac{C2\,\text{total} - \{B\}/100 \times C2(B)}{\{A\}/100}$$

Examples 1 to 4

Two propylene polymers (polymers (B) and (A)) were prepared by successive polymerization reactions in liquid propylene in the presence of a catalytic system that contains a solid based on titanium trichloride such as described in Example 1 of U.S. Pat. No. 4,210,729 and diethylaluminum chloride. The respective quantities of catalytic solid and of aluminum compound are such that the Al/Ti molar ratio=10. A sample of polymer prepared in the first stage (polymer (B)) is taken for analysis at the end of the first stage.

The polymerization conditions as well as the properties of polymers (A) and (B) are presented in Table 1 hereinafter.

TABLE 1

| Characteristics | Example 1 | Example 2 | Example 3 |
|---|---|---|---|
| First stage - Polymer (B) | | | |
| Pressure (bar) | 20 | 20 | 20 |
| Temperature (° C.) | 50 | 50 | 50 |
| Hydrogen (mol %) | 9.2 | 9.2 | 9.5 |
| Ethylene (mol %) | 1.4 | 1.26 | 1.05 |
| Residence time (h) | 1.25 | 1.65 | 1.5 |
| Second stage - Polymer (A) | | | |
| Pressure (bar) | 20 | 20 | 20 |
| Temperature (° C.) | 50 | 50 | 50 |
| Hydrogen (mol %) | 9 | 9.1 | 8.8 |
| Ethylene (mol %) | 0.2 | 0.4 | 0.2 |
| Residence time (h) | 2.5 | 3 | 3 |
| Composition | | | |
| C2 total (wt %) | 2.5 | 2.2 | 1.5 |
| C2(A) (wt %) | 0.4 | 0.9 | 0.4 |
| C2(B) (wt %) | 3.4 | 3.0 | 2.2 |
| MFI (g/10 minutes) | 10.3 | 12.5 | 8.3 |
| $MFI_{(A)}$ (g/10 minutes) | 10 | 11.5 | 9 |
| $MFI_{(B)}$ (g/10 minutes) | 10.3 | 12.5 | 8.3 |
| {B} wt % | 71 | 65 | 62 |
| {A} wt % | 29 | 35 | 38 |

This application is based on the French language document, SPE 00/19, having the title, "Composition a Base de Polymeres du Propylene et Procede Pour Son Obtention" the entire contents of which are hereby incorporated by reference, the same as if set forth at length.

Having now fully described this invention, it will be apparent to one of ordinary skill in the art that many changes and modifications can be made thereto without departing from the spirit or scope of the invention as set forth herein.

What is claimed is:

1. A composition, comprising: (a) from 15 to 54 parts by weight of a propylene polymer (A) comprising up to 2% by weight of ethylene and having a melt flow index $MFI_{(A)}$ of 0.1 to 30 g/10 minutes, measured according to ASTM D 1238 (1986) under a load of 2.16 kg at 230° C.; and (b) from 85 to 46 parts by weight of a polymer (B), which is a statistical copolymer of propylene comprising from 1 to 10% by weight of ethylene and having a melt flow index $MFI_{(B)}$ of 0.1 to 30 g/10 minutes; wherein the ethylene concentration of polymer (B) is greater than that of polymer (A).

2. The composition according to claim 1, wherein polymer (A) does not contain any monomeric units derived from 1-butene.

3. The composition according to claim 1, wherein polymer(B) does not contain any monomeric units derived from 1-butene.

4. The composition according to claim 1, wherein the melt flow indices $MFI_{(A)}$ and $MFI_{(B)}$ satisfy the equation $0.8 \leq MFI_{(B)}/MFI_{(A)} \leq 15$.

5. The composition according to claim 1, wherein polymer (A) has a fluexural modulus, measured at 23° C. on an injection-molded specimen with a thickness of 4 mm in accordance with ASTM D 790 M, of 1000 to 2000 Mpa.

6. The composition according to claim 1, wherein polymer (B) has a flexural modulus measured at 23° C. on an injection-molded specimen with a thickness of 4 mm in accordance with ASTM D 790 M, of 400 to 1600 Mpa.

7. The composition according to claim 1, wherein polymer (A) contains 0.1 to 2 wt % of ethylene.

8. The composition according to claim 1, wherein polymer (B) contains 1.5 to 5.5 wt % of ethylene.

9. The composition according to claim 1, wherein the $MFI_{(B)}$ ranges from 3 to 5 g/10 minutes.

10. The composition according to claim 1, wherein the $MFI_{(A)}$ ranges from 0.4 to 15 g/10 minutes.

11. The composition according to claim 1, further comprising at least one selected from the group consisting of stabilizer, pigment, coloring agent, filler, nucleating agent, fire-retarding agent, antistatic agent, lubricant, non-stick agent, and mixtures thereof.

12. The composition according to claim 1, wherein an MFI value of said composition ranges from 1 to 30 g/10 minutes.

13. The composition according to claim 1, wherein said composition has a flexural modulus of 600 to 1800 Mpa.

14. The composition according to claim 1, wherein said composition has a flexural modulus of 800 to 1600 MPa and an MFI of 3 to 15 g/10 minutes.

15. An article, comprising the composition according to claim 1.

16. The article according to claim 15, which is in the form of film, sheet, expanded granule.

17. A process for preparing a polymeric composition, comprising two successive polymerization stages, wherein 15 to 54 parts by weight of a polypropylene polymer (A) comprising up to 2% by weight of ethylene and having a melt flow index $MFI_{(A)}$ of 0.1 to 30 g/10 minutes, measured according to ASTM D 1238 (1986) under a load of 2.16 kg at 230 C and from 85 to 46 parts by weight of a polymer (B), which is a statistical copolymer of propylene comprising from 1 to 10% by weight of ethylene and having a melt flow index $MFI_{(B)}$ 0.1 to 30 g/10 minutes are respectively prepared and contacted, and the polymer present in a preponderant quantity in said composition is prepared in the first polymerization stage, and a polymer present in a minority quantity in said composition is prepared in the second polymerization stage in the presence of the polymer obtained in the first polymerization stage.

18. The process according to claim 17, further comprising contacting polymer (A) and polymer (B).

19. The process according to claim 17, wherein a polymer present in a preponderant quantity in said composition is prepared in a first stage, and a polymer present in a minority quantity in said composition is subsequently prepared in the presence of the polymer obtained in the first stage.

20. The process according to claim 17, wherein the polymers (A) and (B) are obtained by polymerization in the presence of one or more catalytic systems comprising a solid based on titanium trichloride, an alkylaluminum and optionally an electron donor.

* * * * *